US008022797B2

(12) United States Patent
Takeda et al.

(10) Patent No.: US 8,022,797 B2
(45) Date of Patent: Sep. 20, 2011

(54) SUPERCONDUCTING COIL APPARATUS AND INDUCTOR-TYPE SYNCHRONOUS MACHINE

(75) Inventors: Toshio Takeda, Funabashi (JP); Hidehiko Sugimoto, Fukui (JP); Toru Okazaki, Osaka (JP)

(73) Assignees: IHI Corporation (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 12/305,755

(22) PCT Filed: Jun. 20, 2007

(86) PCT No.: PCT/JP2007/062418
§ 371 (c)(1),
(2), (4) Date: May 4, 2010

(87) PCT Pub. No.: WO2007/148722
PCT Pub. Date: Dec. 27, 2007

(65) Prior Publication Data
US 2010/0283564 A1 Nov. 11, 2010

(30) Foreign Application Priority Data
Jun. 23, 2006 (JP) .................................. 2006-174008

(51) Int. Cl.
*H01F 6/06* (2006.01)
(52) U.S. Cl. ........................................ 335/216; 335/296
(58) Field of Classification Search .................. 335/216, 335/296–299
See application file for complete search history.

(56) References Cited

U.S. PATENT DOCUMENTS

| 5,107,240 | A  |   | 4/1992  | Tashiro et al.          |
|-----------|----|---|---------|-------------------------|
| 5,140,290 | A  | * | 8/1992  | Dersch .......... 505/211 |
| 5,581,135 | A  |   | 12/1996 | Ito et al.               |
| 5,672,921 | A  | * | 9/1997  | Herd et al. ...... 310/52 |
| 7,095,153 | B1 | * | 8/2006  | Shoykhet ......... 310/260|
| 2009/0093369 | A1 | * | 4/2009 | Kwon et al. ..... 505/166 |

FOREIGN PATENT DOCUMENTS

| EP | 0 805 545   | 11/1997 |
|----|-------------|---------|
| JP | 6-38418     | 2/1994  |
| JP | 07-187081   | 7/1995  |
| JP | 8-242557    | 9/1996  |
| JP | 2000-323321 | 11/2000 |
| JP | 2004-104853 | 4/2004  |
| JP | 2006-81316  | 3/2006  |
| JP | 2006-136071 | 5/2006  |
| SU | 450242      | 4/1975  |

OTHER PUBLICATIONS

Office Action for Russian Application No. 2009101218 mailed Apr. 12, 2010.
International Search Report mailed Jul. 31, 2007 in corresponding PCT International Application No. PCT/JP2007/062418.
Russian Decision on Grant—A Patent for Invention (Notice of Allowance), dated Sep. 27, 2010, issued in corresponding Russian Patent Application No. 2009101218/09 (001480), filed Jun. 20, 2007, total 5 pages. English Translation 3 pages.

* cited by examiner

*Primary Examiner* — Anh Mai
*Assistant Examiner* — Bernard Rojas
(74) *Attorney, Agent, or Firm* — Ostrolenk Faber LLP

(57) ABSTRACT

This superconducting coil apparatus includes: a cylindrical coil container which has an inner circumferential surface and an outer circumferential surface; a superconducting coil which is stored in the coil container to be cooled so that a superconducting member is wound on the inner circumferential surface; and a columnar magnetic body which is fitted to the inner circumferential surface of the coil container.

3 Claims, 9 Drawing Sheets

SUPERCONDUCTING COIL APPARATUS AND INDUCTOR-TYPE SYNCHRONOUS MACHINE

CROSS-REFERENCE TO RELATED APPLICATIONS

The present application is a 35 U.S.C. §§371 national phase conversion of PCT/JP2007/062418, filed Jun. 20, 2007, which claims priority of Japanese Patent Application No. 2006-174008, filed on Jun. 23, 2006. The PCT International Application was published in the Japanese language.

TECHNICAL FIELD

The present invention relates to a superconducting coil apparatus and an inductor-type synchronous machine, including the superconducting coil apparatus, which rotates with the synchronization of the polarity change of an armature and the rotation of a rotating shaft.

The present application claims priority of Japanese patent application No. 2006-174008, filed on Jun. 23, 2006, the contents of which are incorporated herein.

BACKGROUND ART

When a current flows through a superconducting coil around which a superconducting member is wound, magnetic flux lines of a magnetic field generated in the superconducting coil pass through the superconducting coil itself. For this reason, particularly, if a bismuth-based superconducting member is used, the amount of the flowing current is reduced as a magnetic flux density increases, and the current is difficult to flow. Accordingly, in view of the fact that, at a cryogenic temperature (liquid helium temperature), since the bismuth-based superconducting member has a much higher critical magnetic field than a metal-based material, it is proposed that the whole superconducting coil is cooled to the cryogenic temperature by liquid neon or liquid helium (for example, see Patent Document 1).

In such a superconducting coil apparatus, the amount of the current flowing through the superconducting coil can be maintained even when the magnetic flux density increases.
Patent Document 1: Japanese Patent Application, First Publication No. 2000-323321

DISCLOSURE OF THE INVENTION

Problems to be Solved by the Invention

However, in the above-described superconducting coil apparatus, liquid neon or liquid helium is used as a refrigerant for the superconducting coil and thus the refrigerant becomes difficult to use. Accordingly, for example, although an inductor-type synchronous machine employs the superconducting coil apparatus, the cooling system becomes large in scale and thus the structure of the whole synchronous machine including the coil becomes complicated and increases in size.

The present invention has been achieved in view of the above-described problem and an object of the present invention is to provide a superconducting coil apparatus preferably ensuring the amount of a current flowing to a superconducting coil having a large magnetic flux density even when liquid nitrogen which is easier to use than liquid helium is used as a refrigerant, and an inductor-type synchronous machine using the superconducting coil apparatus.

Means for Solving the Problem

In order to achieve the above object, a first aspect of the present invention employs a superconducting coil apparatus including: a cylindrical coil container which has an inner circumferential surface and an outer circumferential surface; a superconducting coil which is stored in the coil container to be cooled so that a superconducting member is wound on the inner circumferential surface; and a columnar magnetic body which is fitted to the inner circumferential surface of the coil container.

According to the present invention, by passing magnetic flux lines generated when a current flows to the superconducting coil through the columnar magnetic body in an axial direction, the magnetic flux lines passing through the superconducting coil can be weakened. Therefore, even when the superconducting coil is cooled at a temperature of the liquid nitrogen, not the liquid neon, the liquid helium or the like, the current can sufficiently flow to the superconducting coil. At this time, the maximum magnetic flux density is limited by the maximum magnetic flux density of the columnar magnetic body. However, since the columnar magnetic body is not cooled, the magnetic flux density can be maintained.

A second aspect of the present invention employs the superconducting coil apparatus according to the first aspect, in which circumferential edge portions of both end surfaces of the columnar magnetic body are each provided with a flange and the flanges are brought into contact with both end surfaces of the coil container.

According to the present invention, a larger magnetic flux density than in the case where the flanges are not provided can be obtained.

A third aspect of the present invention employs the superconducting coil apparatus according to the second aspect, in which the flanges are formed to be narrowed toward both the end surfaces of the columnar magnetic body.

According to the present invention, a larger magnetic flux density than in the case where the flanges have a uniform shape can be obtained.

A fourth aspect of the present invention employs the superconducting coil apparatus according to the first aspect, in which the columnar magnetic body is formed by assembling a plurality of plate-shaped pieces along a plurality of planes including a central axis line or parallel to the central axis line and an insulator is provided between surfaces of the plate-shaped pieces adjacent to each other.

According to the present invention, the adjacent plate-shaped pieces are electrically insulated by the insulators. Therefore, even when a current is produced in the columnar magnetic body by a magnetic field generated in the superconducting coil, the current does not flow to the adjacent plate-shaped pieces. A current around the central axis line can be interrupted and the magnetic flux density can be preferably maintained.

A fifth aspect of the present invention employs an inductor-type synchronous machine having the superconducting coil apparatus according to the first aspect.

According to the present invention, since the inductor-type synchronous machine has the superconducting coil apparatus according to the present invention, the inductor-type synchronous machine can properly obtain electric power when being used as an electric generator. In addition, the inductor-type synchronous machine can obtain proper output when being used as an inductor.

Effect of the Invention

According to the present invention, even when liquid nitrogen, which is easier to use than liquid helium, is used as a refrigerant, an amount of a current flowing to a superconducting coil having a large magnetic flux density can be preferably ensured.

Figure 1:
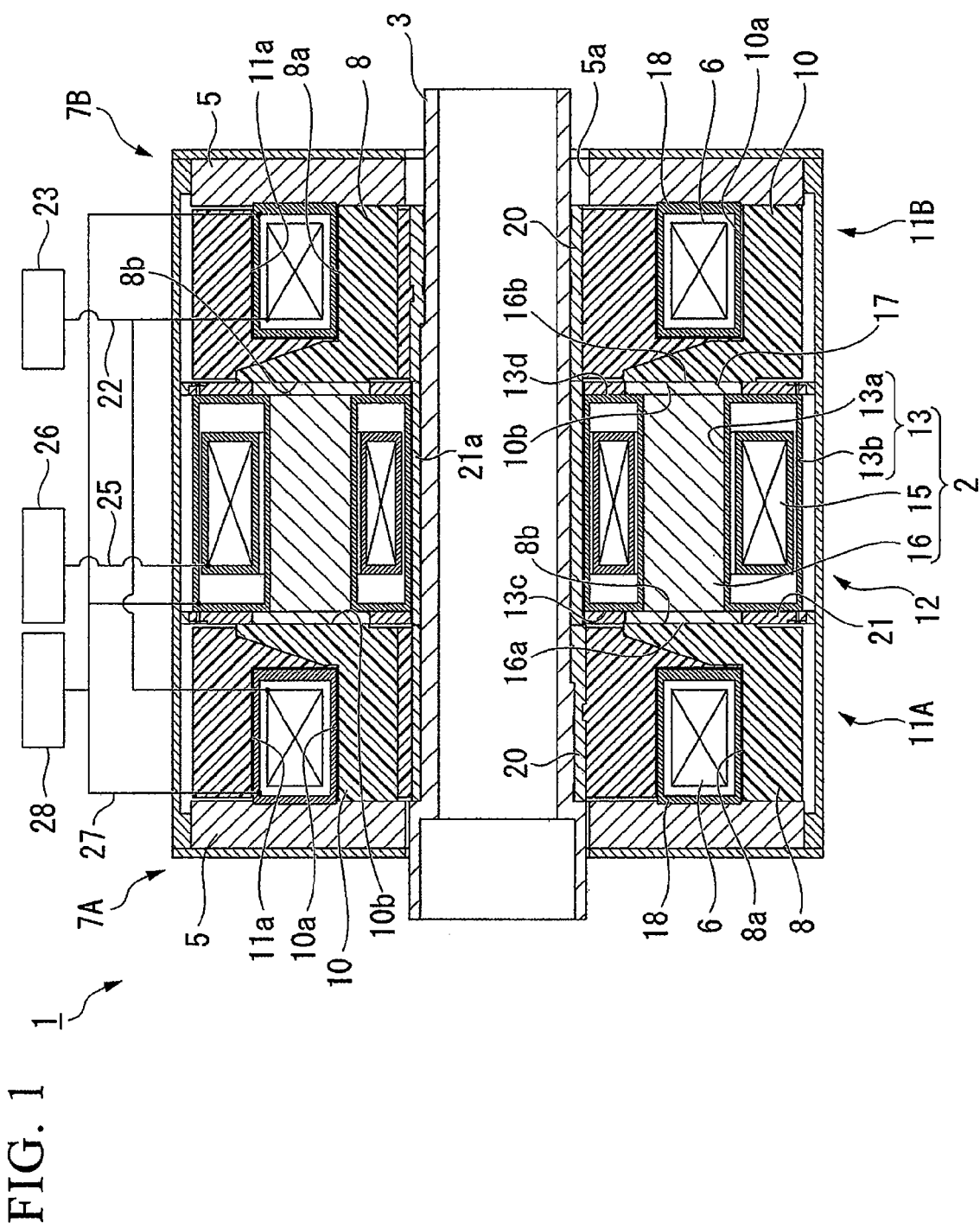
FIG. 1 is a cross-sectional view schematically showing the internal structures of a superconducting coil apparatus and a superconducting motor according to a first embodiment of the present invention.

DESCRIPTION OF REFERENCE NUMERALS AND SIGNS 1, 33, 40, 41, 46: SUPERCONDUCTING MOTOR (INDUCTOR-TYPE SYNCHRONOUS MACHINE)
2, 30, 35: SUPERCONDUCTING COIL APPARATUS
13: ARMATURE HEAT INSULATION REFRIGERANT CONTAINER (COIL CONTAINER)
13a: INNER CIRCUMFERENTIAL SURFACE
13b: OUTER CIRCUMFERENTIAL SURFACE
15: ARMATURE COIL (SUPERCONDUCTING COIL)
16, 31, 36: COLUMNAR MAGNETIC BODY
17, 32: FLANGE
32a: INCLINED SURFACE
37A, 37B, 37C, 37D, 37E, 37F, 37G: PLATE-SHAPED PIECE

BEST MODE FOR CARRYING OUT THE INVENTION

A first embodiment of the present invention will be described with reference to FIGS. 1 to 7.

A superconducting motor (inductor-type synchronous machine) 1 according to the present invention is a superconducting motor having an axial gap structure, which has superconducting coil apparatuses 2 and a rotating shaft 3 at the center thereof. The superconducting motor includes: a pair of field-side stators 7A and 7B, each of which has a yoke 5 made of a magnetic material and a field coil 6 protruding from the yoke 5 in an axial direction of the rotating shaft 3 to form an N pole and an S pole in a radial direction and which are bilaterally disposed so as to be opposed to each other in the direction of the rotating shaft 3; a pair of rotors 11A and 11B, each of which has N pole inductors 8 disposed so as to be opposed to the N pole formed by the field coil 6 and magnetized and S pole inductors 10 disposed so as to be opposed to the S pole formed by the field coil 6 and magnetized, the pair of rotors 11A and 11B are bilaterally disposed so as to be opposed to each other in the direction of the rotating shaft 3; and an armature-side stator 12 which is held in between the pair of rotors 11A and 11B and supports the rotating shaft 3 so that the rotating shaft can rotate and penetrate therethrough, and in which the superconducting coil apparatuses 2 are disposed.

The superconducting coil apparatuses 2 have a cylindrical armature heat insulation refrigerant container (coil container) 13 having an inner circumferential surface 13a and an outer circumferential surface 13b, an armature coil 15 stored in the armature heat insulation refrigerant container 13 to be cooled so that a bismuth-based or yttrium-based superconducting member is wound on the inner circumferential surface 13a, and a cylindrical columnar magnetic body 16 fitted to the inner circumferential surface 13a of the armature heat insulation refrigerant container 13. The superconducting coil apparatuses 2 are incorporated at predetermined intervals on the same circumference of the armature-side stator 12 around the rotating shaft 3 so that both end surfaces 16a and 16b of each columnar magnetic body 16 are opposed to the N pole inductor 8 and the S pole inductor 10.

Figure 2:
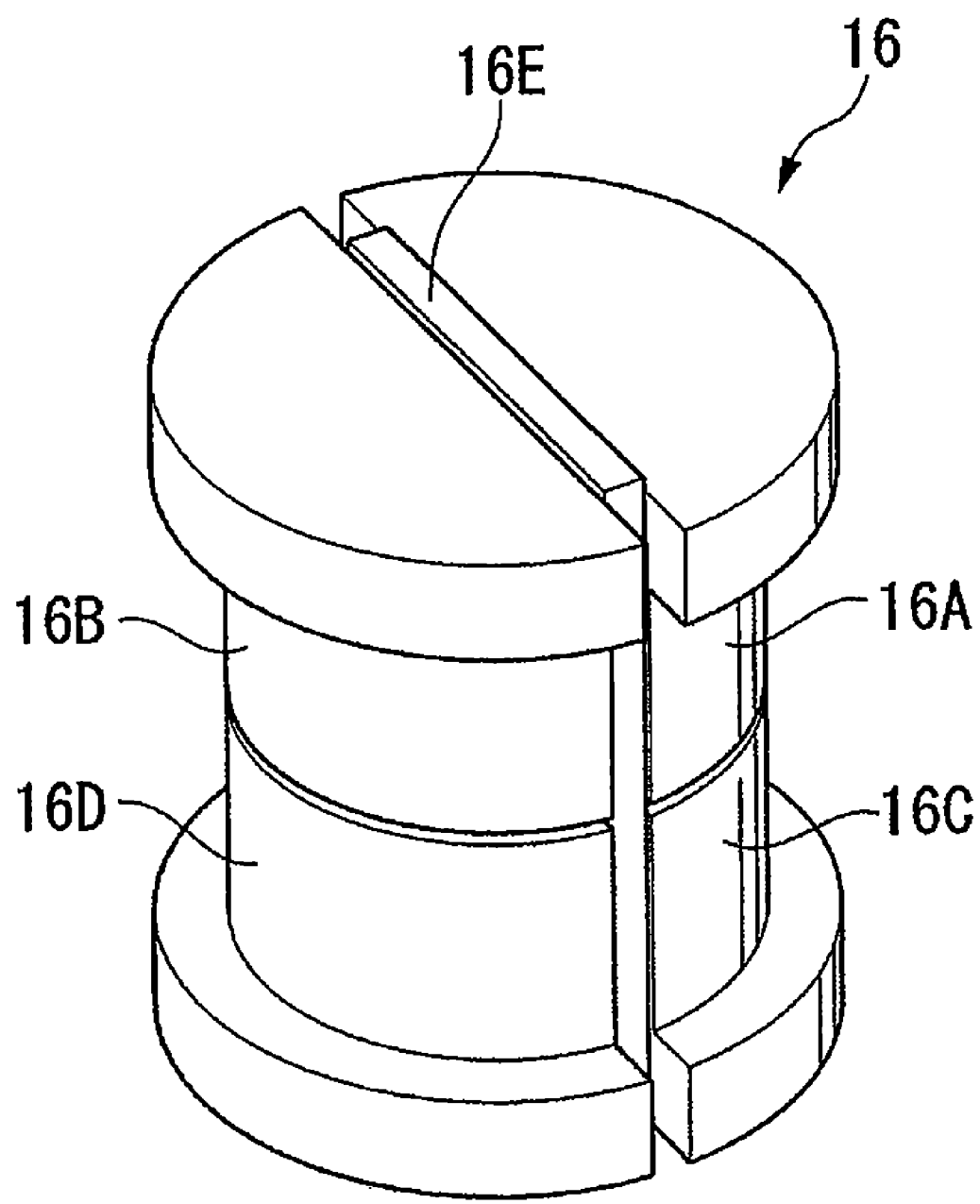
FIG. 2 is a view showing a columnar magnetic body of the superconducting motor according to the first embodiment of the present invention.

As shown in FIG. 2, the columnar magnetic body 16 has a structure in which 4 columnar pieces 16A, 16B, 16C and 16D made of a high permeability material such as permendur, a silicon steel sheet, iron, permalloy or the like are disposed around a plate-shaped piece 16E so as to be combined with each other. The columnar magnetic body is disposed so as to penetrate a rotor body 21 to be described later. Circumferential edge portions acting as both the end surfaces 16a and 16b of the columnar magnetic body 16 are provided with a flange 17 protruding in the radial direction from the body portion in which the cylinder is divided by the surface including a central axis line thereof. The flange 17 has a larger outer diameter than the outer diameter of the columnar magnetic body 16 so as to be brought into contact with both end surfaces 13c and 13d of the armature heat insulation refrigerant container 13.

Accordingly, in assembling the superconducting coil apparatus 2, first, the plate-shaped piece 16E passes through a central hole of the armature heat insulation refrigerant container 13 to insert the body portions of the columnar pieces 16A, 16B, 16C and 16D therearound from both end surfaces of the armature heat insulation refrigerant container 13. Otherwise, for example, the columnar pieces 16A and 16B are disposed around the plate-shaped piece 16E in a manner penetrating from the end surface 13c of the armature heat insulation refrigerant container 13 and the body portions of the other columnar pieces 16C and 16D are inserted to the armature heat insulation refrigerant container 13 from the end surface 13d. In this manner, in a state in which the cylindrical portion of the columnar magnetic body 16 is fitted to the armature heat insulation refrigerant container 13, the flanges 17 protrude from both end surfaces 13c and 13d of the armature heat insulation refrigerant container 13.

The yoke 5 is made of a magnetic material such as permendur, a silicon steel sheet, iron, permalloy or the like and is formed in a disk shape having a predetermined thickness in the direction of the rotating shaft 3. At the center of the yoke 5, a through hole 5a having a diameter so as to be penetrated by the rotating shaft 3 is provided. Field heat insulation refrigerant containers 18, which are formed in an annular shape around the rotating shaft 3, protrude in the direction of the rotating shaft 3 from inner surfaces of the yoke 5 opposed to each other. The field heat insulation refrigerant containers 18 are filled with liquid nitrogen and the field coil 6 is stored therein.

The field coil 6 is made of a bismuth-based or yttrium-based superconducting material. The field coil is stored in the field heat insulation refrigerant containers 18 so as to be wound around the rotating shaft 3. For this reason, when the field coil 6 is excited, an outer circumferential side and an inner circumferential side are divided in the radial direction to generate a magnetic pole.

Figure 3:
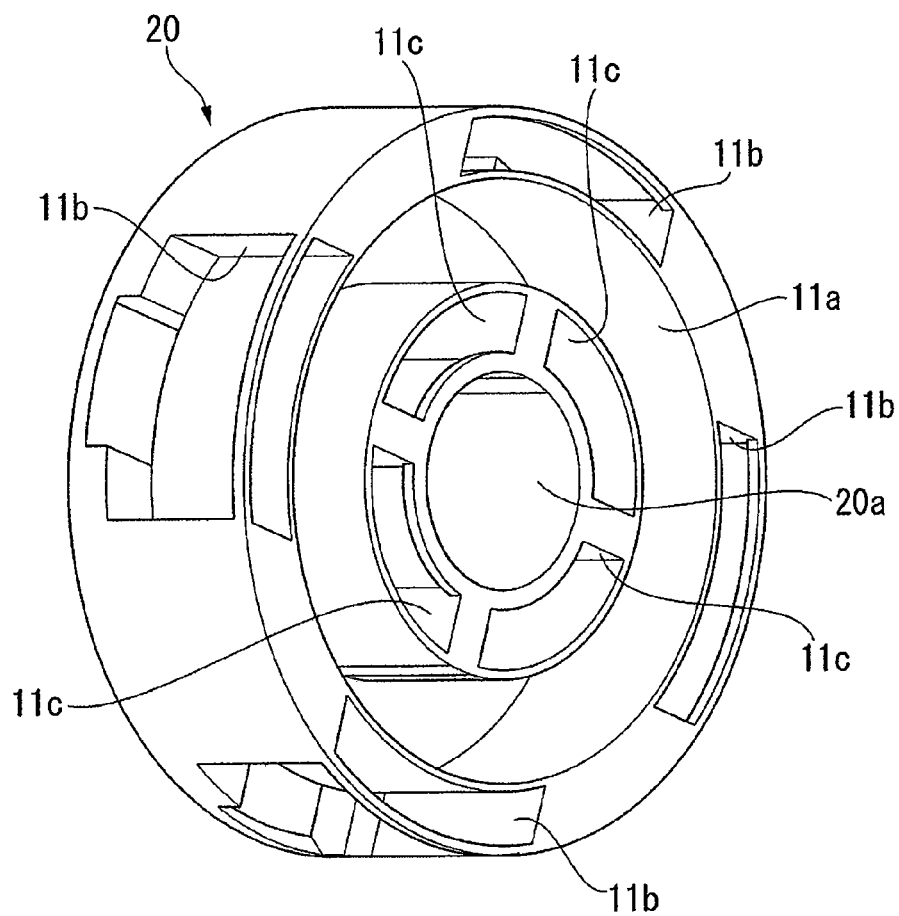
FIG. 3 is a perspective view showing a rotor body of the superconducting motor according to the first embodiment of the present invention.

As shown in FIG. 3, each of the pair of rotors 11A and 11B has a rotor body 20 made of a nonmagnetic material such as FRP or stainless steel and supporting the rotating shaft 3 by a fitting hole 20a provided at the center thereof. In an outer surface of the rotor body 20 opposed to the yoke 5, an engaging groove 11a engaging with the field coil 6 is formed in an annular shape around the rotating shaft 3. A plurality of storage concave portions 11b and 11c are formed in a circumferential direction so as to surround the engaging hole 11a and to store the N pole inductors 8 or the S pole inductors 10 therein.

Figure 4:
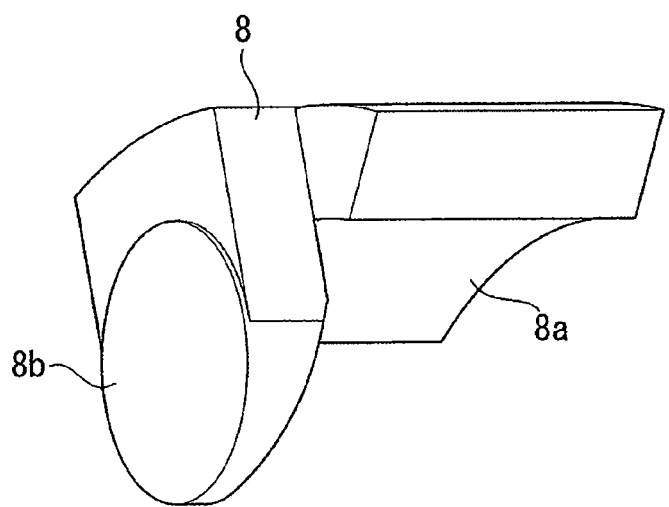
FIG. 4 is a perspective view showing an N pole inductor of the superconducting motor according to the first embodiment of the present invention.
Figure 5:
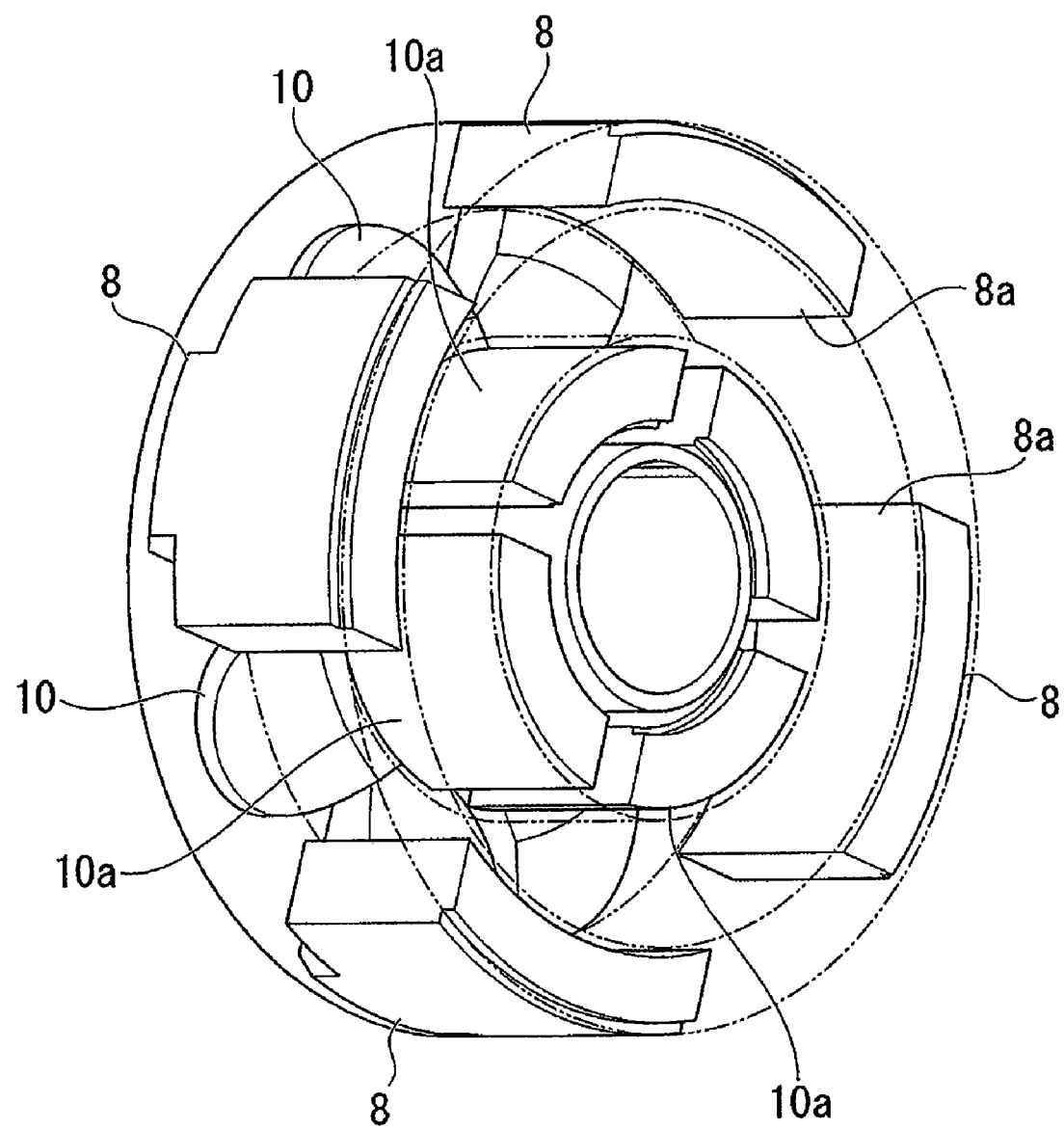
FIG. 5 is a perspective view showing the arrangement of N pole inductors and S pole inductors of the superconducting motor according to the first embodiment of the present invention.
Figure 6:
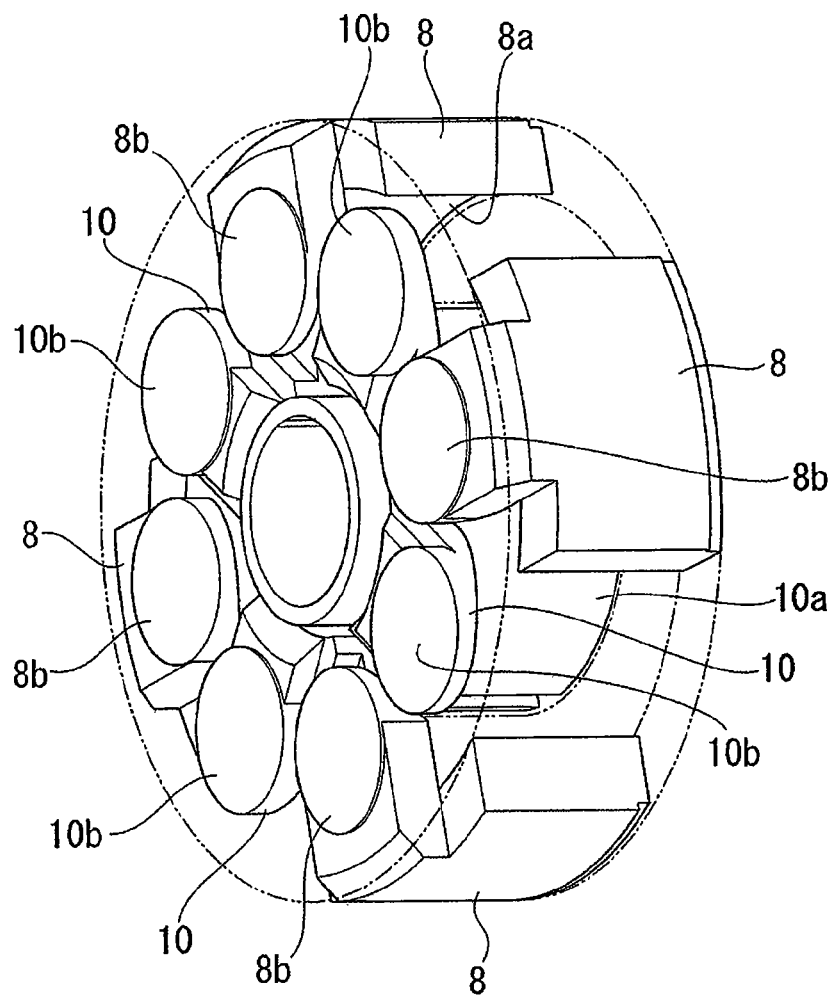
FIG. 6 is a perspective view showing the arrangement of N pole inductors and S pole inductors of the superconducting motor according to the first embodiment of the present invention.

As shown in FIG. 4, the N pole inductors 8 are provided with one end surface 8a which is formed in a curved surface shape so as to be opposed to the field heat insulation refrigerant container 18 from outward or inward in the radial direction, and the other end surface 8b which is formed in an elliptical plate shape so as to be long in the circumferential direction of the rotor body 20 and so as to be short in the radial direction when opposed to the columnar magnetic body 16 or in a substantially disk shape. As shown in FIGS. 5 and 6, a total of four N pole inductors 8 are each disposed at a position point-symmetrical with respect to the center of the rotor body 20 in a penetrating manner in the direction of the rotating shaft 3. In this case, the one end surface 8a of each N pole inductor 8 is disposed to be opposed to an N pole generation position of the field coil 6 while facing the engaging groove 11a. The other end surface 8b is disposed so as to be opposed to the armature coil 15.

Figure 7:
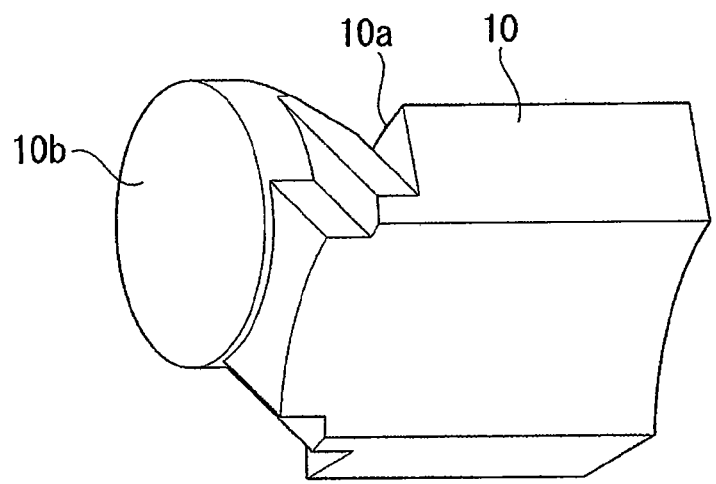
FIG. 7 is a perspective view showing an S pole inductor of the superconducting motor according to the first embodiment of the present invention.

As shown in FIG. 7, the S pole inductors 10 are provided with one end surface 10a which is formed in a curved surface shape so as to be opposed to the field heat insulation refrigerant container 18 from outward or inward in the radial direction, and the other end surface 10b which is formed in an elliptical plate shape so as to be long in the circumferential direction of the rotor body 20 and so as to be short in the radial direction when opposed to the columnar magnetic body 16 or in a substantially disk shape. As shown in FIGS. 5 and 6, a total of four S pole inductors 10 are each disposed at a position point-symmetrical with respect to the center of the rotor body 20 and different in phase by about 90 degrees with respect to the N pole inductor 8 in a penetrating manner in the direction of the rotating shaft 3. In this case, the one end surface 10a of each S pole inductor 10 is disposed so as to be opposed to an S pole generation position of the field coil 6 while facing the engaging groove 11a. The other end surface 10b is disposed so as to be opposed to the armature coil 15.

The N pole inductors 8 and the S pole inductors 10 are made of a magnetic material such as permendur, silicon steel sheet, iron, permalloy or the like.

The armature-side stator 12 has a stator body 21 made of a nonmagnetic material such as FRP or stainless steel. At the center of the stator body 21, a through hole 21a through which the rotating shaft 3 passes is disposed. In the stator body 21, six superconducting coil apparatuses 2 are incorporated at predetermined intervals on the same circumference.

A DC current source 23 is connected to the field coil 6 via a DC electric wiring 22. Further, an AC current source 26 is connected to the armature coil 15 via an AC electric wiring 25. Meanwhile, a cooler 28 using liquid nitrogen as a refrigerant via cooling piping 27 is connected to the field heat insulation refrigerant container 18 and the armature heat insulation refrigerant container 13. The cooler 28 is connected to a driving power source (not shown) for cooling and circulating the liquid nitrogen.

Next, the operations of the superconducting coil apparatus 2 according to this embodiment and the superconducting motor 1 having the superconducting coil apparatus will be described.

First, the cooler 28 is driven to supply liquid nitrogen to the field heat insulation refrigerant container 18 and the armature heat insulation refrigerant container 13 via the cooling piping 27. The field coil 6 and the armature coil 15 disposed in the field heat insulation refrigerant container 18 and the armature heat insulation refrigerant container 13 are each cooled to be in a superconducting state.

Next, DC current is supplied to each field coil 6 from the DC source 23. At this time, depending on the direction of the DC current, for example, an N pole is formed outward in the radial direction of the field coil 6 and an S pole is formed inward in the radial direction in the field-side stator 7A. Accordingly, the N pole is guided to the other end surface 8b of the N pole inductor 8, which is opposed to the armature-side stator 12. On the other hand, the S pole is guided to the other end surface 10b of the S pole inductor 10, which is opposed to the armature-side stator 12. The same magnetic poles are formed depending on the direction of DC current in the field-side stator 7B and the N and S poles are guided to the other end surfaces 8b and 10b of the N pole inductor 8 and the S pole inductor 10, respectively.

In this state, three-phase AC current is supplied to the armature coil 15 from the AC current source 26. At this time, by phase differences between the three phases, a rotating magnetic field rotating around the rotation shaft 3 is generated in the armature coil 15. In addition, magnetic flux lines pass through the columnar magnetic body 16 in an axial direction and thus magnetic poles different from each other appear alternately in accordance with an AC cycle on both end surfaces 16a and 16b of the columnar magnetic body 16. The rotating magnetic field repeats suction and repelling actions between the other end surfaces 8b and 10b of the N pole inductor 8 and the S pole inductor 10 to generate a rotating force around the rotating shaft line in the same direction between the pair of rotors 11A and 11B and thus the rotating shaft 3 is rotated.

According to this superconducting motor 1, since the superconducting coil apparatus 2 includes the columnar magnetic body 16, the magnetic flux lines passing through the armature coil 15 itself are also allowed to pass through the columnar magnetic body 16 to weaken the magnetic flux lines passing through the armature coil 15 itself. Accordingly, even when the armature coil 15 is cooled to a temperature of liquid nitrogen, not liquid neon or liquid helium, a sufficient current can flow to the armature coil 15. At this time, the maximum magnetic flux density is limited by the maximum magnetic flux density of the columnar magnetic body 16. However, since the columnar magnetic body 16 is not cooled, the magnetic flux density can be maintained. Further, since both the end surfaces 16a and 16b of the columnar magnetic body 16 are provided with the flange 17, a larger magnetic flux density can be obtained.

Further, since no coil is disposed in the pair of rotors 11A and 11B, only the field coil 6 and the armature coil 15 disposed in the stators may be supplied with electric power and cooled and the electric system and the cooling system can be simplified in structure. In this case, by engaging the field coil 6 with the engaging groove 11a of the rotor body 20, the field coil 6 can be disposed in the rotor body 20 so as to be surrounded by the N pole inductor 8 and the S pole inductor 10 in the radial direction. Accordingly, as the thickness of each of the field-side stators 7A and 7B in the axial direction thereof, only the thickness required for the yoke 5 may be considered without the consideration of the protrusion amount of the field coil 6 to the rotor 11A or 11B and the length thereof in the direction of the rotating shaft 3 can be reduced.

Figure 8:
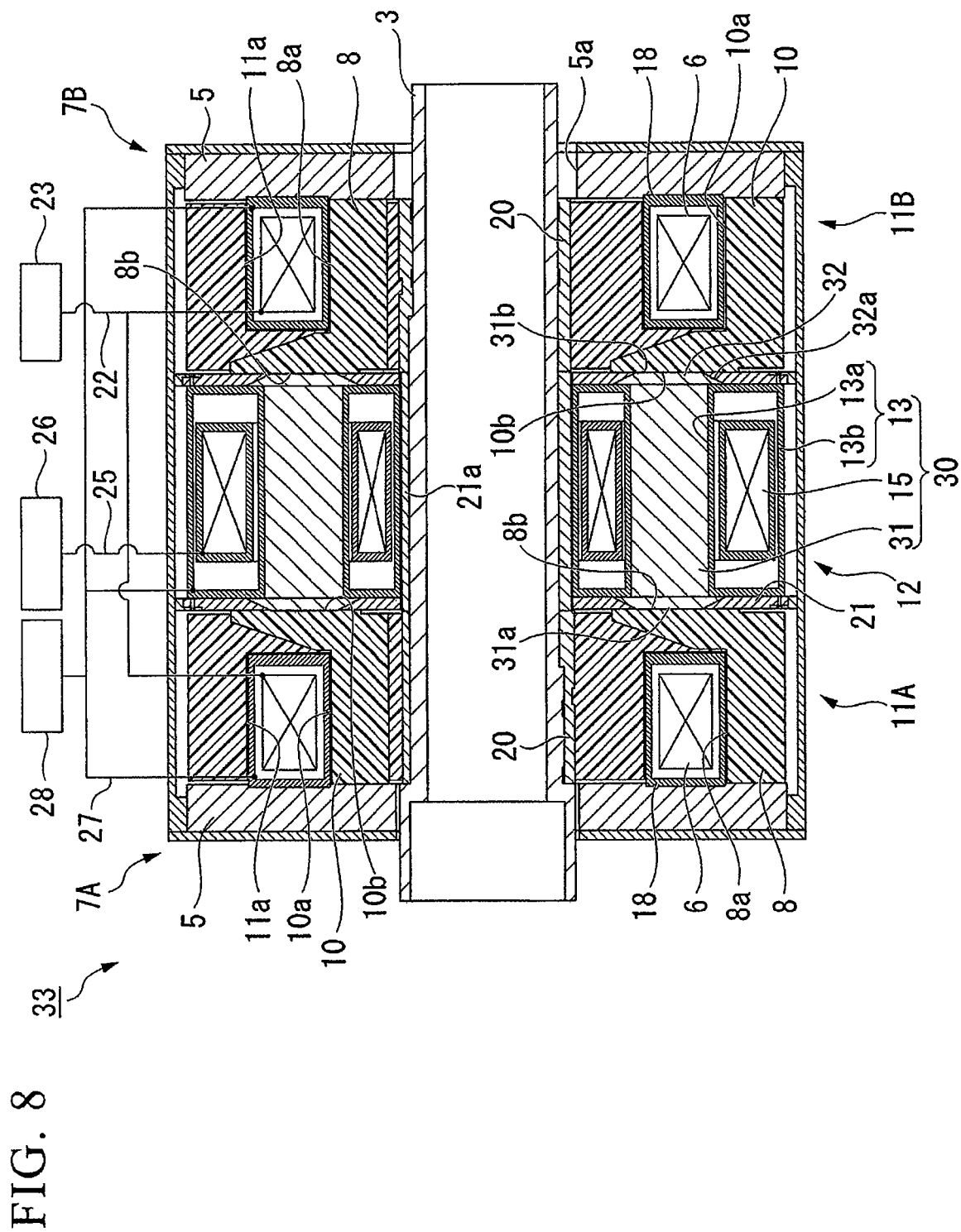
FIG. 8 is a cross-sectional view schematically showing the internal structures of a superconducting coil apparatus and a superconducting motor according to a second embodiment of the present invention.

Next, a second embodiment will be described with reference to FIG. 8.

The same components as in the above-described first embodiment are denoted by the same reference numerals, and descriptions thereof will be omitted. The second embodiment is different from the first embodiment in that flanges 32 provided in a columnar magnetic body 31 of a superconducting coil apparatus 30 according to this embodiment are narrowed toward both end surfaces 31a and 31b of the columnar magnetic body 31, and thus inclined surfaces 32a are formed. Other structure of a superconducting motor 33 having the superconducting coil apparatus 30 is the same as in the first embodiment.

The operations of the superconducting coil apparatus 30 and the superconducting motor 33 will be described.

As in the first embodiment, the field coil 6 and the armature coil 15 are each cooled to be in a superconducting state and then DC current is supplied to the field coil 6. An N pole and an S pole are guided to the other end surfaces 8b and 10b of the N pole inductor 8 and the S pole inductor 10, respectively.

In this state, three-phase AC current is supplied to the armature coil 15 from the AC current source 26. At this time, as described above, by phase differences between the three phases, a rotating magnetic field rotating around the rotation shaft 3 is generated in the armature coil 15. In this case, magnetic flux lines pass through the columnar magnetic body 31 in an axial direction. Since the flanges 32 are further provided with the inclined surfaces 32a, the magnetic flux lines pass through the inclined surfaces 32a of the flanges 32 in addition to both end surfaces 31a and 31b.

In this manner, the rotating magnetic field having a larger magnetic flux density than in the first embodiment is generated. Suction and repelling actions are repeated between the other end surfaces 8b and 10b of the N pole inductor 8 and the S pole inductor 10 to generate a rotating force around the rotating shaft line in the same direction between the pair of rotors 11A and 11B and thus the rotating shaft 3 is rotated.

According to the superconducting coil apparatus 30 and the superconducting motor 33, as in the first embodiment, a larger magnetic flux density than in the case where the flanges 32 have a uniform shape can be obtained.

Figure 9:
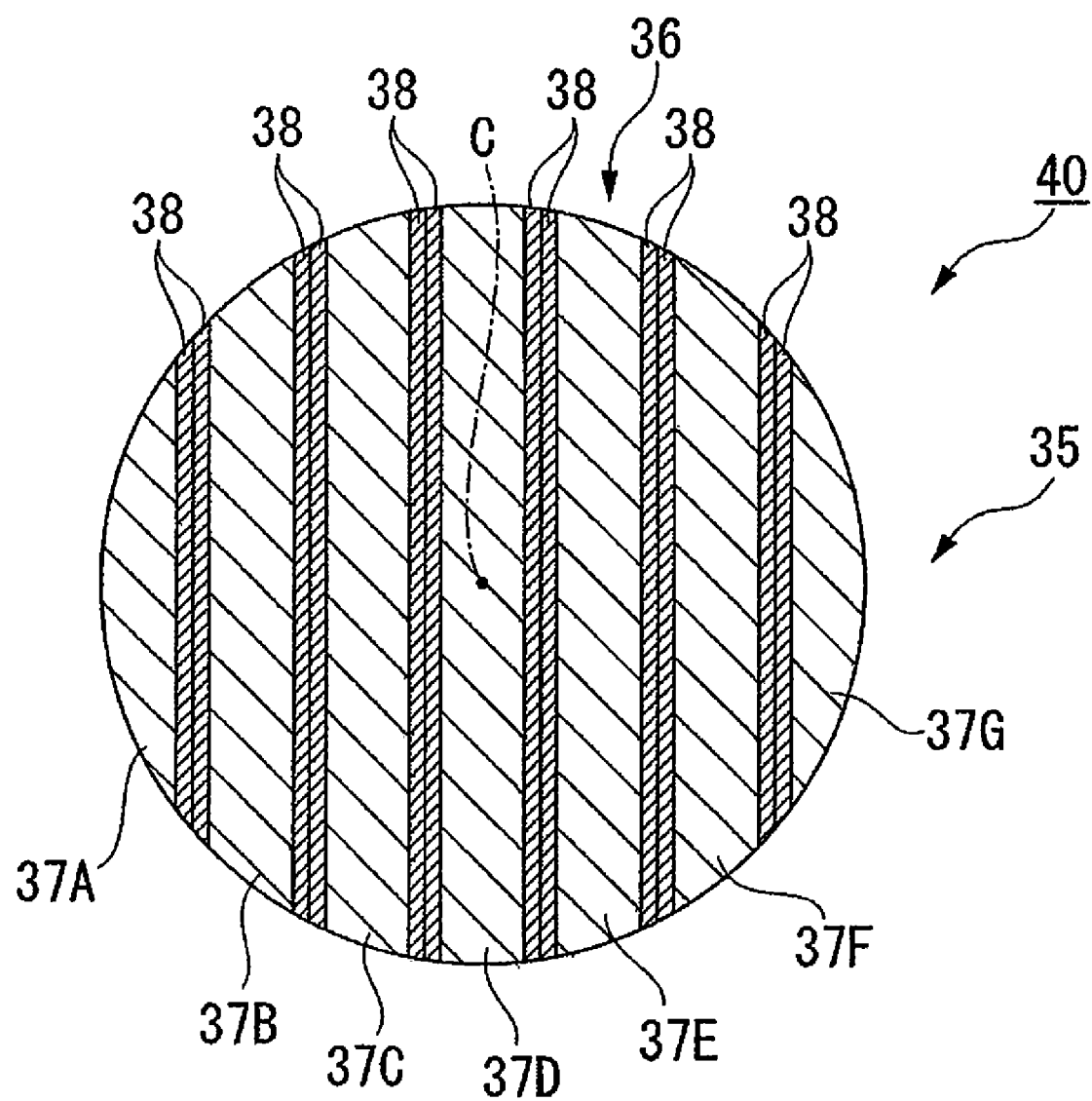
FIG. 9 is a cross-sectional view showing a columnar magnetic body of a superconducting coil apparatus according to a third embodiment of the present invention.

Next, a third embodiment will be described with reference to FIG. 9.

The same components as in the above-described embodiment are denoted by the same reference numerals, and descriptions thereof will be omitted. The third embodiment is different from the first embodiment in that a columnar magnetic body 36 of a superconducting coil apparatus 35 according to the present invention is formed by assembling a plurality of plate-shaped pieces 37A to 37G along a plurality of planes including a central axis line C or parallel to the central axis line C and an insulator 38 is provided between surfaces of the plate-shaped pieces 37A to 37G adjacent to each other.

The operations of the superconducting coil apparatus 35 and a superconducting motor 40 having the superconducting coil apparatus will be described. Also in this embodiment, a rotating shaft (not shown) is rotated by the same operations as those of the superconducting coil apparatuses 2 and the superconducting motor 1 according to the first embodiment. In this case, the plate-shaped pieces 37A to 37G are electrically insulated by the insulators 38. Accordingly, even when a current is produced in the columnar magnetic body 36 by a magnetic field generated in an armature coil (not shown), the current around the central axis line C is interrupted between the plate-shaped pieces 37A to 37G. Accordingly, according to the superconducting coil apparatus 35 and the superconducting motor 40, a magnetic flux density of the magnetic field generated by the armature coil can be preferably maintained.

The technical scope of the present invention is not limited to the above-described embodiments and various changes can be made without departing from the spirit and scope of the present invention. For example, in the above-described embodiments, the inductor-type synchronous machine is the superconducting motor. However, the inductor-type synchronous machine may be used as an electric generator which generates electric power by rotating the rotating shaft 3.

In addition, in the above-described embodiments, the columnar magnetic body 16 is provided with the flanges 17, but its end surfaces may not have the flanges. In this case, it is not required that the columnar magnetic body be divided into columnar or plate-shaped pieces. Further, when the columnar magnetic body and the armature heat insulation refrigerant container 13 are fitted to each other, a fixing member may be provided to ensure the connection thereof.

Figure 10:
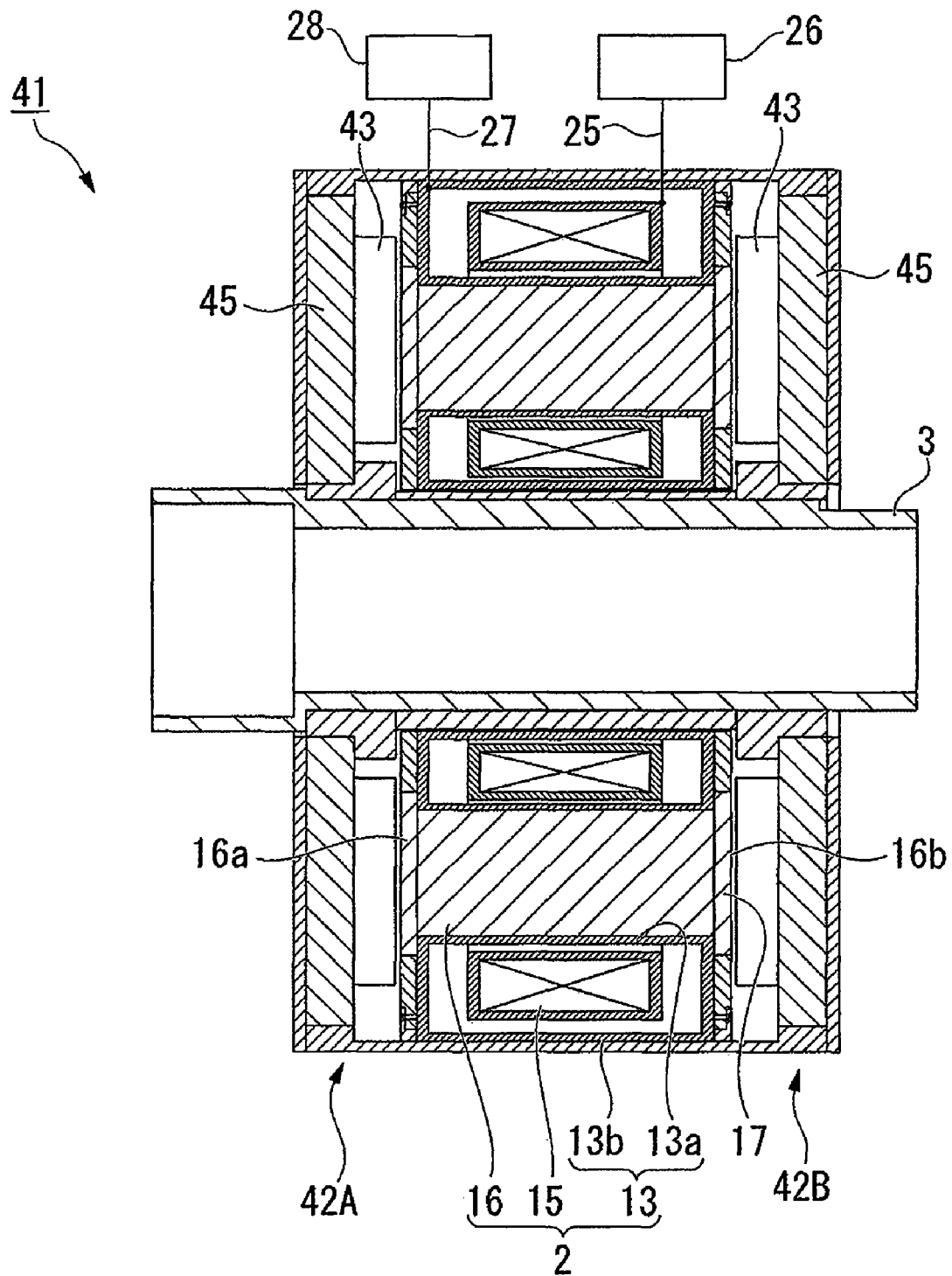
FIG. 10 is a cross-sectional view schematically showing the internal structures of a superconducting coil apparatus and a superconducting motor according to a modified example of the present invention.

Further, in the superconducting motor 1 according to the first embodiment, the yoke 5 of each of the field-side stators 7A and 7B is provided with the field coil 6 including a superconducting member. However, in place of the field coil 6, the N pole inductor 8 and the S pole inductor 10, a pair of rotors 42A and 42B of a superconducting motor 41 may be provided with a permanent magnet 43, as shown in FIG. 10. In this case, the permanent magnet 43 equal in size and disposed in a similar manner to the other end surfaces 8b and 10b of the N pole inductor 8 and the S pole inductor 10 according to the first embodiment is disposed in a rotor body 45 so as to be opposed to the superconducting coil apparatus 2. The rotor body 45 includes the same magnetic body as the yoke 5 of the armature-side stator 12 according to the first embodiment and is connected to the rotating shaft 3.

Figure 11:
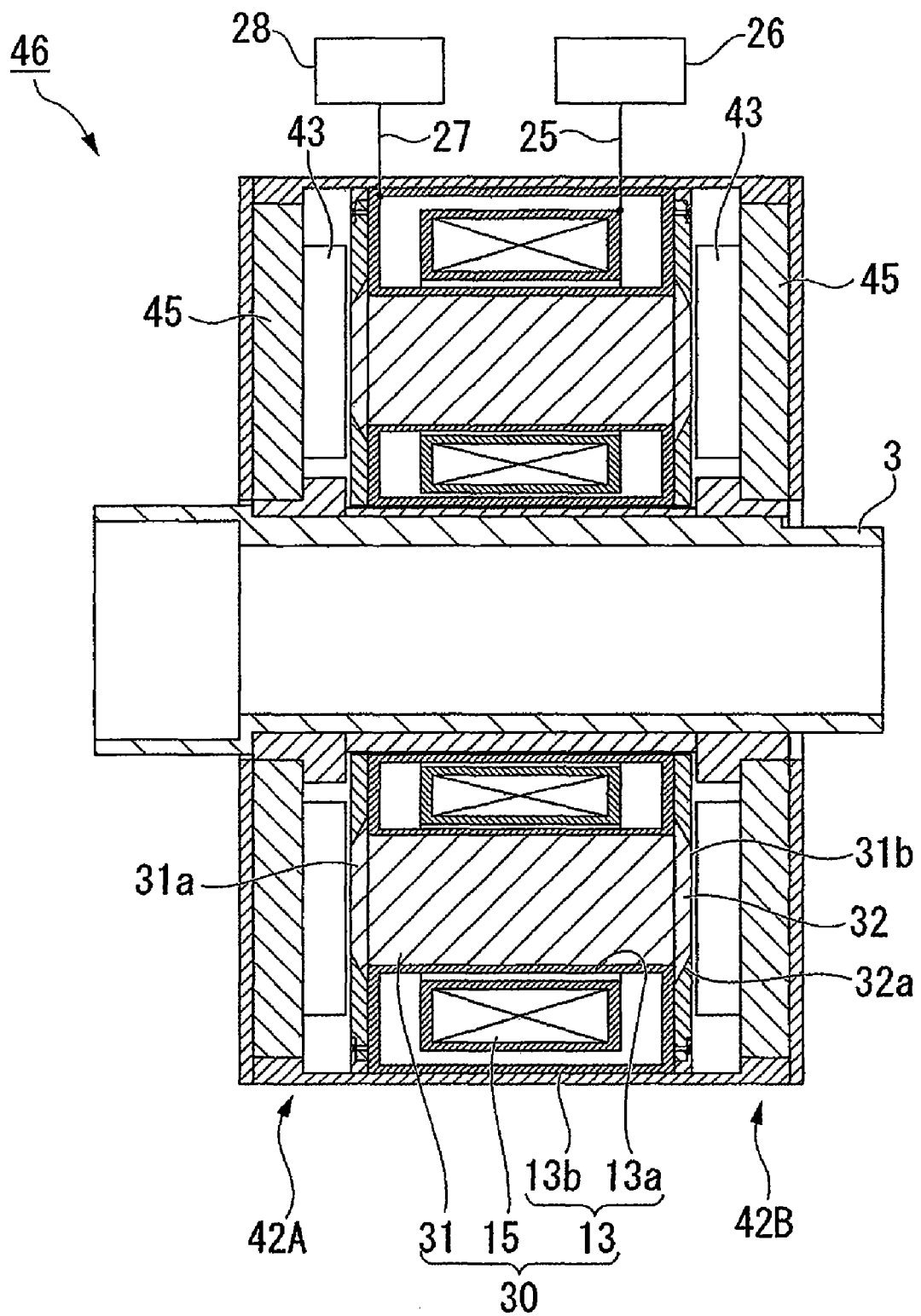
FIG. 11 is a cross-sectional view schematically showing the internal structures of a superconducting coil apparatus and a superconducting motor according to a modified example of the present invention.

The superconducting motor 41 has the same superconducting coil apparatus 2 as in the first embodiment. Accordingly, in a state in which three-phase AC current is supplied to the armature coil 15 of the superconducting coil apparatus 2 from the AC current source 26, the rotating shaft 3 is rotated by the same operation as that of the superconducting motor 1 according to the first embodiment in which DC current flows to the field coil 6. In addition, similar effects to those of the first embodiment can be obtained. Moreover, as shown in FIG. 11, a superconducting motor 46 having the permanent magnet 43 may have the superconducting coil apparatus 30 according to the second embodiment.

In addition, in the above-described embodiments, the present invention employs the inner rotor type in which the rotating shaft 3 connected to the centers of the pair of rotors rotates with the pair of rotors, but is not limited thereto. For example, the present invention may provide an inductor-type synchronous machine of an outer rotor type in which a shaft portion disposed at the center thereof is a fixed shaft and an outer circumference is connected to a pair of rotors.

Further, the number of the combination of the N pole inductors and the S pole inductors and the armature coils is not limited to the above description. For example, the number of the N pole inductors and the number of the S pole inductors may be two each, and the number of the armature coils may be three. In addition, the number of the N pole inductors and the number of the S pole inductors may be eight each, and the number of the armature coils may be twelve.

The invention claimed is:

1. A superconducting coil apparatus comprising:
   a cylindrical coil container which has an inner circumferential surface and an outer circumferential surface and two end surfaces;
   a superconducting coil comprising a superconducting member, the superconducting coil being stored in the coil container to be cooled so that the superconducting member is wound on the inner circumferential surface; and
   a columnar magnetic body which is fitted to the inner circumferential surface of the coil container and having two end surfaces, each end surface having a circumferential edge portion,
   wherein the circumferential edge portions of the two end surfaces of the columnar magnetic body are each provided with a flange, and each flange is brought into contact with an end surface of the coil container, and
   wherein each flange includes an inclined surface narrowed toward one end surface of the columnar magnetic body at a position where magnetic flux lines pass through the columnar magnetic body in an axial direction of the columnar magnetic body.

2. The superconducting coil apparatus according to claim 1, wherein the columnar magnetic body is formed by assembling a plurality of plate-shaped pieces along a plurality of planes including a central axis line or parallel to the central axis line, and
   wherein an insulator is provided between surfaces of the plate-shaped pieces adjacent to each other.

3. An inductor-type synchronous machine comprising the superconducting coil apparatus according to claim 1.

* * * * *